No. 657,007. Patented Aug. 28, 1900.
F. RICHTER.
VALVE FOR PNEUMATIC TIRES OF BICYCLES.
(Application filed Oct. 28, 1899.)
(No Model.)
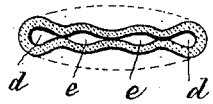
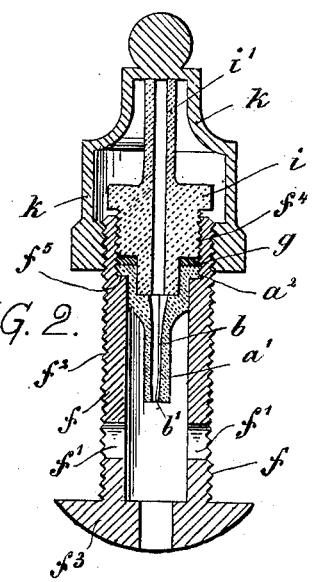
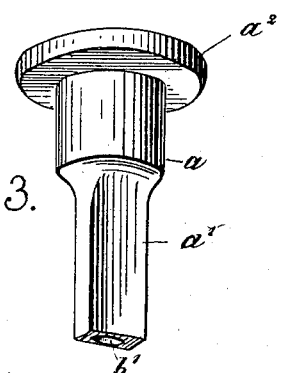
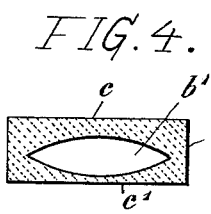
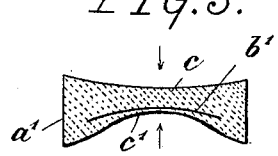

UNITED STATES PATENT OFFICE.

FRANZ RICHTER, OF COLOGNE, GERMANY.

VALVE FOR PNEUMATIC TIRES OF BICYCLES.

SPECIFICATION forming part of Letters Patent No. 657,007, dated August 28, 1900.

Application filed October 28, 1899. Serial No. 735,099. (No model.)

*To all whom it may concern:*

Be it known that I, FRANZ RICHTER, a subject of the King of Prussia, German Emperor, residing at Cologne-on-the-Rhine, in the Kingdom of Prussia, Germany, have invented certain new and useful Improvements in Valves for Pneumatic Tires of Bicycles, (for which I have applied for a patent in Germany, dated January 6, 1899,) of which the following is a specification.

My invention relates to improvements in valves for pneumatic tires of bicycles, whereby a valve is obtained which acts in a very safe and perfect manner.

The construction of the new valve is a very simple one, as the essential part of the same consists of an elastic flat tube carried in a suitable manner by the valve-box connected to the pneumatic tire, said flat tube, which is obtained by casting, being provided through its whole length with an elliptically-shaped hole narrower at the bottom than at the top and not lying in the middle of the named flat tube, so that at the lower part of the said tube a narrow slit with two adjacent lips of different sizes is formed, the one broad lip being rather rigid, the other one, which is much thinner, being quite yielding. Owing to this disposition the operation of the valve is such that as air is pumped into the interior of the pneumatic tube the lower slit of the flat tube opens and lets air enter, while if one cease to pump air the pressure of the air contained in the pneumatic tire acts so as to press firmly the smaller lip of the flat tube against the broad one, so that now no air can escape from the interior of the pneumatic tire.

I am aware that it has already been proposed to replace the elements generally in use in the valves intended for pneumatic tires by a round tube of rubber or other elastic material, the bottom part of which was brought together in order to form a slit with two adjacent lips. Still this disposition by which the hole is not of elliptic form and is central has not given any practical result, because the two lips, owing to their shape, were never pressed together in an efficient manner—that is, firmly enough to let no air escape. For this reason the device has never had a practical value, while owing to the new disposition my contrivance answers fully to its purpose.

In the accompanying drawings, forming a part of this specification, Figure 1 is a section through the old contrivance, which could never be used, as being impracticable. Fig. 2 is a vertical section of my new contrivance in combination with a valve for pneumatic tires specially adapted to this purpose; Fig. 3, a perspective view of the essential part of the new device. Fig. 4 is a cross-section through the flat tube, the slit being open; and Fig. 5, a cross-section through the flat tube, the slit being closed.

The new contrivance, Figs. 2 and 3, which, as already stated, consists, essentially, of a flat tube provided with a slit having a special form and position, possesses advantageously the form shown in Fig. 3, the same comprising an upper ring $a^2$, a middle boss $a$, and a flat tube $a'$, projecting from the boss $a$. The upper part of the contrivance may be recessed, as shown in Fig. 2, and the elliptic hole $b$, which is provided in the direction of the longitudinal axis of said contrivance, is preferably enlarged at its upper part in form of a cone and contracted at its lower part, as shown at $b'$. The elliptic hole $b$, which, as mentioned, is larger at the top and narrower at the bottom, is not central, but is disposed somewhat sidewise, so that a section through the flat tube $a'$ near its bottom part has the shape shown in Fig. 4, the elliptic hole $b'$ being surrounded by a broad lip $c$, which is almost quite rigid, and a thin lip $c'$, which is very flexible and yielding, so that when no outer pressure acts on the lips $c$ and $c'$ of the tube $a'$ the same assumes the position shown in Fig. 4; but when an outer pressure acts on the lips $c$ and $c'$, as shown by arrows in Fig. 5, the thin lip $c'$, which is very flexible, is pressed with great force against the lip $c$, so that no air can pass any more between the lips $c$ and $c'$. This would not be the case if in a way already known a tube be used, as shown in Fig. 1, which is formed by flattening the lower part of a cylindrical tube having a central opening in order to form a slit with two adjacent lips. As shown in Fig. 1, when the lips are pressed together several passages $d\,d$ and $e\,e$ are formed, which always let the air escape, and these passages, especially the side apertures $d$, will never be completely closed, no matter how great the outer pressure on the lips may be. If, on the contrary, the new disposition shown in Fig. 4 be used, the lips close quite perfectly, Fig. 5, even if the outer pressure is not very great.

In order to bring the new contrivance in connection with the usual pneumatic tires, the same must be carried by a special valve-box, which may preferably be designed according to Fig. 2. In a hollow socket formed with side holes $f'$ for allowing the passage of air from the valve into the tire and provided with a screw-thread $f^2$ on its outside and a knob or head $f^3$ at its bottom part is provided an upper recess formed in its interior with a screw-thread $f^4$. On the shoulder $f^5$ of the recess rests the lower part of the ring $a^2$ of the contrivance $a\ a'$, forming the essential part of the present invention. On the upper flange of the ring $a^2$ rests an annular washer $g$, which is pressed on its seat by means of the threaded nut $i$, which can be screwed more or less into the interior of the socket $f$. The nut $i$ is provided on its top with a vertical tube $i'$, adapted to receive the mouth or nozzle of the force-pump which is to pump the air into the interior of the pneumatic tire. Further, a cap $k$ is screwed on the outer screw-thread $f^2$ of the socket $f$, said cap surrounding the nut $i$, so that no dust or the like can enter into the interior of the valve.

The operation of the new valve is as follows: For the sake of pumping air into the valve the cap $k$ is to be screwed away from the thread $f^2$ of the socket. Then the nozzle of the air-pump is brought into connection with the upper tube $i'$ of the nut $i$. Now if air is pumped into the valve the lips $c$ and $c'$, surrounding the slit $b'$, are opened and air enters into the interior of the pneumatic tire after having passed the side holes $f'$ of the hollow socket $f$. As soon as one ceases to pump air the compressed air contained in the pneumatic tire presses against the lips $c$ and $c'$ and closes them absolutely tight, so that no air can escape from inside to outside.

The new contrivance may preferably be made of india-rubber; but the same can also be formed with another suitable material, while the valve-box may be formed of any material of sufficient strength—that is, preferably of metal. Further, it is to be remarked that the hole $b'$ is not elliptical in the proper sense of the word, but is formed of two opposite curves. Still, roughly speaking, it may be called an "elliptic hole."

Having thus described my invention, what I claim, and desire to secure by Letters Patent, is—

1. In a valve for pneumatic tires, a flat tube $a'$ provided with an elliptic hole $b$ in the direction of its longitudinal axis, said hole lying eccentrically with regard to the axis of the tube $a'$, so that at the bottom part $b'$ of said flat tube two lips are formed, the one $c$ being thick and almost rigid, the other $c'$ thin and flexible, substantially as described and for the purpose specified.

2. In a valve for pneumatic tires, a flat tube $a'$, a boss $a$ adjacent to the tube $a'$, a ring $a^2$ on the top of the boss $a$ and an elliptic hole lying eccentrically with regard to the axis of the tube $a'$, said hole being narrower at the lower part than at the upper part of the tube $a'$, substantially as set forth.

3. In a valve for pneumatic tires, the combination of the tube $a'$ provided with an elliptic hole $b'$ lying eccentrically with regard to the axis of said tube $a'$, the socket $f$ on which the tube $a'$ rests, the ring $g$ resting on the upper part of the tube $a'$, and the nut $i$ screwed into the socket $f$, substantially as set forth.

4. In a valve for pneumatic tires, the combination of the tube $a'$ adjacent to the boss $a$ and to the ring $a^2$, the tube $a'$ being provided with an elliptic hole $b'$ lying eccentrically with regard to the axis of said tube $a'$, the socket $f$ on which the ring $a^2$ of the tube $a'$ rests, the tube $g$ resting on the upper part of the tube $a'$, and the nut $i$ screwed into the socket $f$, substantially as set forth.

5. A valve, comprising a casing, and a collapsible tube having opposing walls, one of which is of less stiffness than the other.

6. A valve, comprising a collapsible tube having opposing walls, one of which is of less stiffness than the other.

7. A valve, comprising a flat collapsible tube, one side wall of which is of less stiffness than the side opposite.

In testimony whereof I have hereunto set my hand in the presence of two witnesses.

FRANZ RICHTER.

Witnesses:
NIKOLAUS NEURER,
WILLIAM H. MADDEN.